June 15, 1926.
N. A. CHRISTENSEN
SEALING VALVE
Filed March 8, 1924
1,588,657
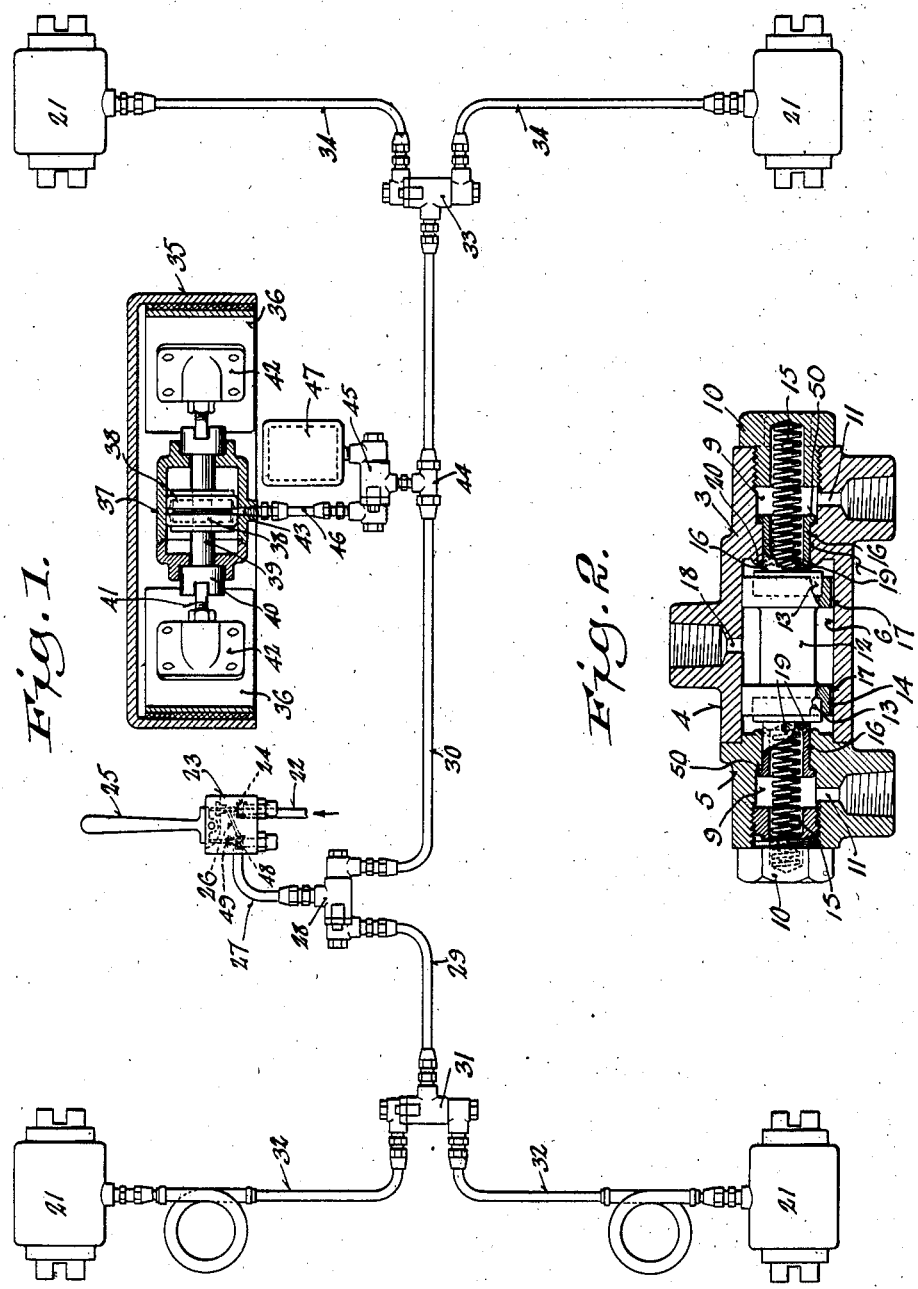
INVENTOR.
NIELS A. CHRISTENSEN
BY
Quarles + French
ATTORNEYS.

Patented June 15, 1926.

1,588,657

UNITED STATES PATENT OFFICE.

NIELS A. CHRISTENSEN, OF MILWAUKEE, WISCONSIN.

SEALING VALVE.

Application filed March 8, 1924. Serial No. 697,813.

The invention relates to sealing valves for air lines.

The object of the invention is to provide a device, more particularly a valve, for automatically sealing the open end of a broken connection in compressed air lines, and more particularly to a sealing valve for use in air brake lines so that when one of the lines to one of the brakes becomes ruptured the other brakes will not be rendered inoperative by escape of air through the broken lines.

The invention further consists in the several features hereinafter set forth and more particularly defined by claims at the conclusion hereof.

In the drawings: Fig. 1 represents a braking system for vehicles combined with sealing valves embodying the invention, parts of which are shown in section; Fig. 2 is a detail sectional view through one of the sealing valves embodying the invention.

Referring to Fig. 2, the sealing valve comprises a suitable casing 3, here shown as formed of a main part 4 and an end part 5 suitably secured to the part 4, as by means of bolts or machine screws. This casing has a central chamber 6 formed therein and bores 7 extend from said chamber 6 into valve chambers 9 which are closed at their ends by removable screw plugs 10 and which communicate through ducts 11 with the pipes of the system.

Within the chamber 6 I mount a balanced sealing valve 12 having valve faces 13, preferably made by inserting circular plates of suitable composition material into recesses in the enlarged ends 14 of the member 12. The sealing valve is normally held in a floating and inoperative position by means of springs 15, each having one end seated in a bore in the screw plug 10 and its other end seated in a bore in a flanged end plug 16 suitably mounted in the bore 7, each of which plugs bear against the adjacent face 13 of the valve 12. The enlarged ends 14 of the valve each have ducts or bypasses 17 formed therein to provide restricted communication between the space formed between the heads of the valve and the ends of said chamber and which, under normal operation permits the passage of compressed air from the central inlet 18, through the chamber 6 and around the heads of the valve, which air then passes through openings 19 in the plugs 16 and thence to the chambers 9 and ducts 11 to the piping of the brake system.

With this construction, if one of the pipes communicating with one of the ducts 11 breaks, thereby causing escape of air through this pipe and hence a sudden reduction of pressure at one end of the valve as opposed to the other which has the air pressure on, then said valve 12 will be shifted so that its face 13 contacts with the seat 20 adjacent that valve chamber 9 which communicates with the broken line and as soon as the valve is seated against the seat 20 the air pressure in the brake system keeps the valve seated and hence prevents any further escape of air from the system and cuts off the broken line.

As illustrative of the manner in which this sealing valve is used and combined in an air brake system for vehicles, I show in Fig. 1 a plurality of brake cylinders 21, each cylinder of which may be suitably associated with a brake mechanism for a wheel of the vehicle, similar to brake mechanism shown and described in connection with the transmission brake. Each of these cylinders 21 is supplied with air through suitable piping from a suitable source of compressed air. Compressed air from a tank, not shown, is conducted through a pipe 22 to a control mechanism 23 including a valve 24 which is adapted to be opened by a handle 25 so that the compressed air from pipe 22 will flow through a duct 26 to a pipe 27 when said handle 25 is turned in one direction. The pipe 27 communicates with one of the sealing valves 28, like that of Fig. 2 and which has previously been described in detail, and pipes 29 and 30 lead from the ducts 11 in said sealing valve. The pipe 29 communicates with another sealing valve 31, like the sealing valve 28, and whose ducts 11 are connected by pipes 32 to the brake cylinders 21 for the two front wheels of the vehicle. The pipe 30 connects with another sealing device 33 similar to the sealing devices 28 and whose ducts 11 communcate through pipes 34 with the brake cylinders for the rear wheels of the vehicle. In case a transmission brake is used, I have shown in Fig. 1 a brake drum 35 which, it is to be understood, is suitably connected to the transmission system of the engine adapted to be acted upon by the brake shoe or shoes 36 which are normally held out of engagement with the brake drum 35 but are moved into engagement by fluid-pressure-operated means in the brake cylinder 37, similar to such means provided in the brake cylinders 21, and consisting of a pair of suitably packed pistons 38 having piston rods 39 with headed ends 40 connected as by a tongue and slot connection with adjusting screws 41 carried by brakes 42 on the brake shoe or shoes. An air duct 43 provides for the introduction of compressed air between the two pistons and which air, on its application, moves the pistons outwardly to apply the brake. A T-connection 44 in the pipe line 30 provides for conveying some of the air therefrom to a sealing valve 45 similar to the sealing valves previously described, one of whose ducts 11 is connected by piping 46 to duct 43 for the brake cylinder 37 and the other duct 11 is connected to a small pressure tank 47.

With this construction under normal operation the opening of valve 24 by the swinging of the handle 25 in a clockwise direction allows the air to pass through pipes 27, 29, 30, 32, 34 and 46, so as to apply the air to all the brakes, the sealing valves interposed between these pipes not interfering with this action as the air passes around the sealing valve, as previously described. To release the brakes the handle 25 is swung in a counterclockwise direction, thereby permitting valve 24 to close and opening a relief valve 48 so that the air may be released from the brake cylinders by returning through the piping to the passage above the valve 48 and exhausting through a passage 49. As the control valve forms no part of the invention herein claimed and any suitable control valve may be used in the system, further description is deemed unnecessary.

With the above described brake system, if either one of the pipe lines 32 becomes ruptured the sealing valve 31 will cut off this line upon each application of braking pressure; similarly, if either one of the pipe lines 34 becomes ruptured the sealing valve 33 will cut off this line; similarly, if either one of the pipes 29 or 30 becomes ruptured the sealing valve 28 will cut off this line, and should pipe 46 become ruptured, then the sealing valve 45 will cut off further passage of air to the pipe 46 since the chamber 47 acts as a reservoir, similar to the brake cylinders, to supply enough air to the sealing valve to cause the same to shift to a sealed position in the same way that one of the brake cylinders associated with the other sealing valves supplies the necessary air pressure to shift the valve to a sealing position. It will be understood that a reservoir similar to 47 may be used in connection with the pipe to each brake cylinder so that such pipe will be cut off independently of the other cylinders.

The flanged ends 50 of the plugs 16 limit their inward movement and thereby permit the use of springs 15, whose strength may be unequal though such variance in the strength of the springs does not interfere in any way with the proper center of the valve, which feature is of commercial advantage in the manufacture of devices of this kind.

From the foregoing, it will be noted that I have provided a sealing valve which is automatically shifted to seal a broken line against further passage of air therethrough by differential pressure created between the broken line and the pressure within the system.

As this application is directed to the sealing valve the claims have been confined thereto and the absence of claims herein to the brake application or its arrangement is not to be considered as a declaration or waiver of right to claims for such subject matter, as the same has been included in my copending application Serial No. 701,062, filed March 22, 1924.

I desire it to be understood that this invention is not to be limited to any specific form or arrangement of parts except in so far as such limitations are specified in the claims.

What I claim as my invention is:

1. An automatic sealing valve for air pipe lines comprising a chamber having an inlet and outlets, plugs slidably mounted in said outlets and having passages, means to limit the inward movement of said plugs, a balanced valve in said chamber having faces engaged by said plugs and adapted to cooperate with faces at the outlets adjacent said plugs, springs acting on said plugs to maintain the valve in a normally inoperative position, means for establishing communication between said inlet and the outlets around said faces, said valve being shifted by a change in pressure conditions at the outlets of the casing whereby release of pressure at one of said outlets will cause a shifting of said valve to close said outlet against escape of air therefrom.

2. In an automatic sealing valve for air pipe lines, the combination of a casing having a chamber provided with an inlet and outlets, hollow plugs slidably mounted in said outlets and having openings establishing communication between said chamber and outlets having flanged portions engageable with said casing to limit the inward movement of said plugs, a valve member in said chamber having faces engaged by said plugs and adapted to cooperate with faces at the outlets adjacent said plugs, springs extending into said plugs and acting thereon to maintain the valve member in a normally inoperative position, and means for establishing communication between said inlet and outlets around said faces, said valve being normally held by said springs in the central open position and being shifted to close one of said outlets by the change in pressure conditions at said outlets.

In testimony whereof, I affix my signature.

NIELS A. CHRISTENSEN.